Feb. 10, 1925.
1,526,109
P. ARENA
SHOE ATTACHMENT FOR VEHICLE WHEELS
Filed Oct. 24, 1923
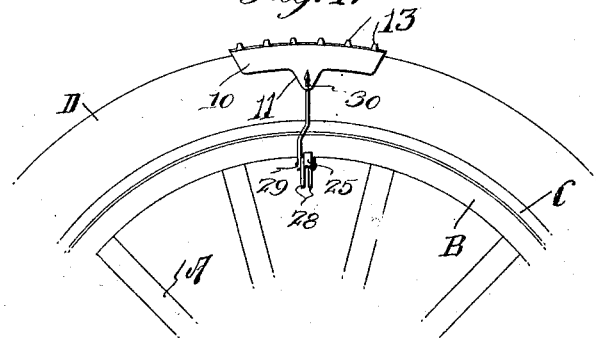
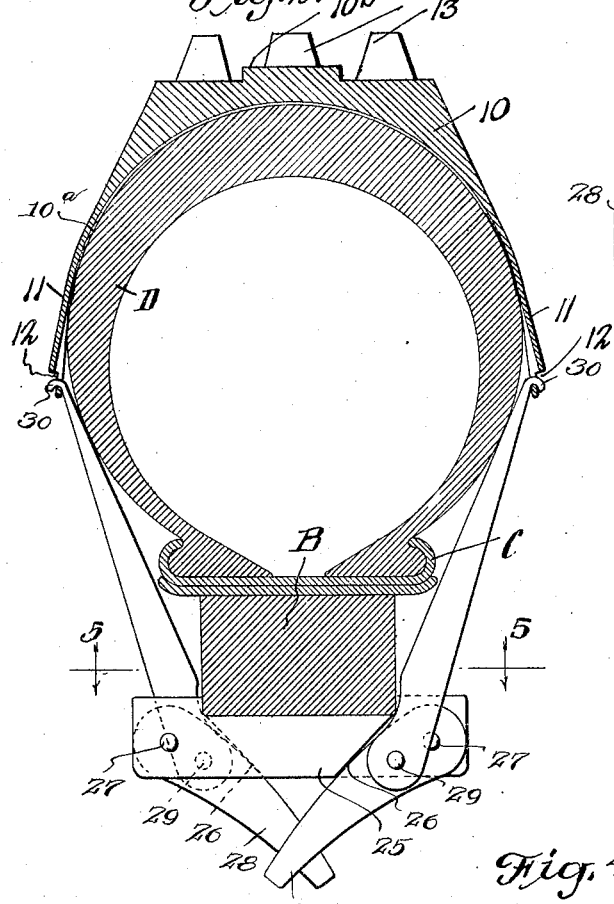
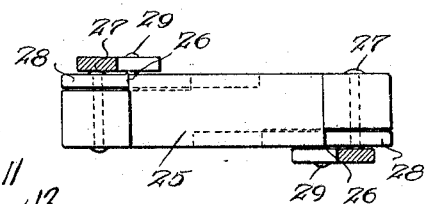
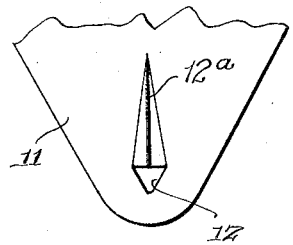
Peter Arena
INVENTOR
BY Victor J. Evans
ATTORNEY
WITNESS:

Patented Feb. 10, 1925.

1,526,109

UNITED STATES PATENT OFFICE.

PETER ARENA, OF WHITEFISH, MONTANA.

SHOE ATTACHMENT FOR VEHICLE WHEELS.

Application filed October 24, 1923. Serial No. 670,564.

*To all whom it may concern:*

Be it known that I, PETER ARENA, a citizen of the United States, residing at Whitefish, in the county of Flathead and State of Montana, have invented new and useful Improvements in Shoe Attachments for Vehicle Wheels, of which the following is a specification.

This invention relates to attachments for vehicle wheels, and has for its object the provision of a novel shoe designed to be detachably engaged upon a motor vehicle wheel for the purpose of preventing skidding and increasing traction, the device being particularly advantageous for use in wet or otherwise slippery places where there is danger of miring unless some means be provided for increasing the traction.

An important object is the provision of a shoe of this character which is provided with peculiar means for holding it in position upon the wheel and tire, the means being quickly and easily releasable when desired.

An additional object is the provision of a device of this character which will be simple and inexpensive in manufacture, easy to apply or remove, efficient in action, durable in service and a general improvement in the art.

With the above and other objects and advantages in view the invention consists in the details of constuction to be hereinafter more fully described and claimed and illustrated in the accompanying drawings, in which:

Figure 1 is a fragmentary side elevation of an automobile wheel carrying a tire and equipped with my device, Figure 2 is a cross sectional view through the tire, rim and felly, this view showing a portion of the invention in section and the remainder in elevation, Figure 3 is a detail section showing one type of calk, Figure 4 is a similar view showing a modified form of calk, Figure 5 is a cross section on the line 5—5 of Figure 2, and Figure 6 is a fragmentary side elevation of a portion of the device illustrating a detail.

Referring more particularly to the drawings, the letter A designates a portion of a vehicle wheel including the usual felly B equipped with a rim C for carrying a tire D.

In carrying out my invention I provide an elongated shoe 10 which is formed of suitable metal and which is curved longitudinally and also transversely for substantially conforming engagement upon the tire D. This shoe is preferably relatively thick at its central or tread portion while it is reduced or thinned toward its edges as clearly shown in Figure 2. In actual practice the shoe may be formed with an intermediate or longitudinal rib 10$^b$. The shoe is lined with canvas or the like indicated at 10$^a$ for preventing chafing of the tire. Formed on the side edges of this shoe are ears 11 provided with holes 12 for a purpose to be described. The holes 12 in the ears are represented as being triangular in shape and it will be noted that the ears are stamped or pressed outwardly along triangular areas indicated at 12$^a$ so that the points where the holes are provided will be offset inwardly with respect to the outer surface.

It is intended that the shoe be provided with calks of some description and in Figure 3 I have illustrated these calks 13 as formed of frusto-conical bodies, having reduced threaded stems 14 screwed into suitable holes in the shoe, while in Figure 4 I have shown the calks 15 as having reduced stems 16 upset within frusto-conical holes 17 in the shoe. Regardless of which method of securing the calks is employed, it will be apparent from an inspection of the drawings that I provide a plurality of these calks arranged at different points so as to provide a rough surface which will insure traction and prevent circumferential slipping or lateral skidding of the tire equipped with the device.

I have shown means for locking the device upon the tire, this means consisting of an elongated bar 25 which is disposable transversely of the felly B at the inner periphery thereof and which has opposite sides cut away on an incline to define abutment shoulders 26. Pivoted on the ends of this bar as shown at 27 are levers 28 upon which are pivoted at 29, at points spaced from the pivots 27 hooks 30 which are engaged within the holes 12 in the ears 11.

In Figure 2 I have shown the locked position of this securing device and it will be observed that when the parts are thus arranged, the shoe may be readily engaged upon the tire and the securing device disposed against the felly with the hooks 30 engaged within the holes 12 of the ears 11. To effect the clamping or locking action, the operator grasps the levers 28 and swings them toward each other until they engage the inclined shoulders 26. This places tension on the shoe so that it will be firmly pressed against the tire. Owing to the fact that the pivots 29 are off center with respect to the pivots 27, it is apparent that the tension of the tire against the shoe will hold the securing device in locked position. To remove the attachment it is merely necessary to swing the levers 28 away from each other and then disengage the hooks from the holes in the ears.

From the foregoing description and a study of the drawings it will be apparent that I have thus provided a simply constructed, inexpensive and highly efficient emergency shoe which may be quickly and easily engaged upon the tire of a wheel, and which will efficiently perform the functions for which it is intended.

While I have shown and described the preferred embodiment of my invention it is of course to be understood that I reserve the right to make such changes in the form, construction and arrangement of parts as will not depart from the spirit of the invention or the scope of the subjoined claims.

Having thus described my invention I claim:

1. A device of the character described comprising a shoe shaped for engagement upon the tread of a tire, a bar disposable transversely against the inner periphery of a wheel felly and recessed to receive the same, levers pivoted upon the projecting ends of said bar, and hooks detachably connected with the shoe at the edges thereof and pivotally connected with said levers at points inwardly of the pivots thereof.

2. A device of the character described comprising a shoe shaped for engagement upon the tread of a tire, a bar disposable transversely against the inner periphery of a wheel felly and recessed to receive the same, levers pivoted upon the projecting ends of said bar, and hooks detachably connected with the shoe at the edges thereof and pivotally connected with said levers at points inwardly of the pivots thereof, said levers being arranged with their free ends in crossed relation when in locked position, and said levers being movable outwardly to release said hooks.

3. A device of the character described comprising an elongated shoe curved longitudinally and transversely for conforming engagement upon a tire, a bar disposable transversely of the inner periphery of the wheel felly and having opposite sides formed with abutment shoulders, levers pivoted on the ends of said bar, and hooks pivoted on said levers and detachably engaged with the edges of said shoe the pivotal connection of the hooks with the levers being out of alignment with the pivotal connection of the levers with the bar when said levers are swung into engagement with said shoulders.

In testimony whereof I affix my signature.

PETER ARENA.